Jan. 15, 1924.  1,480,604
W. DUBILIER
TERMINAL CONNECTION FOR CONDENSERS
Filed Jan. 27, 1921
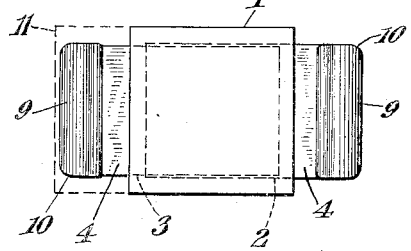
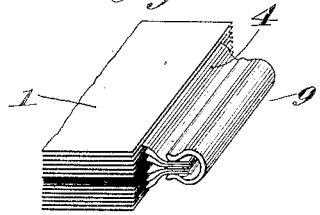
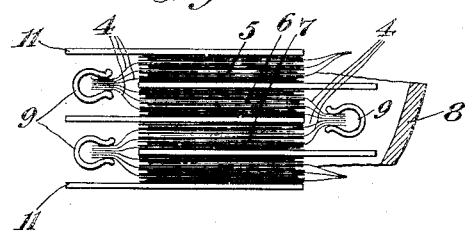
William Dubilier  INVENTOR
BY
Rundle, Wright & Small  ATTORNEYS Patented Jan. 15, 1924.

1,480,604

UNITED STATES PATENT OFFICE.

WILLIAM DUBILIER, OF NEW YORK, N. Y., ASSIGNOR TO DUBILIER CONDENSER & RADIO CORPORATION, A CORPORATION OF DELAWARE.

TERMINAL CONNECTION FOR CONDENSERS.

Application filed January 27, 1921. Serial No. 440,309.

*To all whom it may concern:*

Be it known that I, WILLIAM DUBILIER, a citizen of the United States, residing at New York, in the county of New York and State of New York, have invented a certain new and useful Terminal Connection for Condensers, of which the following is a specification.

The invention has for an object to provide terminal connections for the sections of a high potential condenser which will minimize the occurrence of brush discharge or arcs between terminals and other adjacent metallic bodies.

Another object of the invention is to provide a connection which will afford adequate electrical conductivity and be of such character as not to be readily injured or dislocated during handling or use of the condenser.

Further objects and advantages of the invention will be in part obvious and in part specifically pointed out in the description hereinafter contained which, taken in connection with the accompanying drawings, discloses a preferred embodiment of the invention; such embodiment, however, is to be considered merely as illustrative of its principle. In the drawings:—

Fig. 1 is a top view of a condenser section provided with a terminal connection made in accordance with the invention.

Fig. 2 shows in perspective two condenser sections having a similar terminal connection.

Fig. 3 is a side view of a condenser stack in which the several sections are connected in series, also by means of a similar connection.

The invention is disclosed as applied to condenser sections consisting of rectangular dielectric sheets 1, for example of mica, interleaved with groups of conducting plates of opposite polarity 2 and 3, terminals 4 being provided for each of the above-mentioned groups of conducting plates in the present instance merely by extending portions of the plates of the groups beyond the side edges of the dielectric sheets. The conducting plates ordinarily will be made of a soft metal such as tin foil.

As shown in Fig. 3, a plurality of sections 5, 6 and 7 of the character above described may be assembled into a stack and connected in series by joining the terminals 4 of a group of conducting plates in section 6 to the terminals 4 of a group in section 5 on one side of the stack, while the terminals 4 of the opposite group of plates of section 6 are joined to similar terminals of a group in section 7 next beneath, on another side of the stack, thus adapting the condenser for use with high potential.

When a condenser of the above character is subjected to a high voltage, there will be a substantial difference in potential between the different section terminals 4 which are located along the sides of the stack, and also between some of the terminals and adjacent metallic bodies, such as an enclosing metallic casing 8 for the condenser, as shown in Fig. 3. Thus brush discharges or even arcs are liable to be formed between adjacent terminals, or from the terminals to adjacent metallic bodies, particularly from sharp corners or other irregular surfaces existing in the terminals.

According to the present invention, the terminals are enclosed by metallic members 9 having a smooth rounded contour surrounding the outer extremities of the terminals in such manner as to insure that no irregular surfaces will be presented by the terminals, tending to concentration of the electric field. Thus the electric stresses upon the terminals will be evenly distributed over their surfaces so as to minimize the occurrence of brush discharge or arcs. If desired, the corners 10 of the members 9 may be rounded for the same purpose. Also insulating separator plates 11 may be interposed between sections to form barriers between adjacent terminal connections, such separators preferably overlapping the members 9 both laterally and longitudinally, as shown by the dotted line at the left of Fig. 1.

The members 9 will be understood as suitably cast or forced in position over the terminals 4; in the present instance these members are in the form of sheet metal clips, for example of brass.

The members 9 may also be utilized to insure adequate electrical conductivity in the terminal connections as by crimping or forcing the same into intimate contact with the terminals 4, and if desired the space within the members may be filled with solder for the same purpose. Thus the terminals 4 will be held in close contact across substantially their whole width, and the members 9 will tend to prevent dislocation or injury to the connections when the condenser is being handled during manufacture, or when it is subjected to heat in use.

While a specific embodiment of the invention has been disclosed, it is obvious that many changes may be made therein without departing from the spirit of the invention as defined in the following claims.

I claim:

1. A condenser stack including adjacent sections each provided with a plurality of conducting plates having terminals extending from the sides of the stack in combination with metallic members enclosing the terminals of both sections, said metallic members having a smooth rounded exterior contour at points adjacent the outer extremities of said terminals.

2. A condenser stack including adjacent sections, each having opposite groups of metal foil conducting plates interleaved with dielectric sheets, groups of plates of adjacent sections extending beyond corresponding sides of the stack and being gathered together to form connections between adjacent sections, and metallic members associated with said connections and enclosing the same, said metallic members having a smooth rounded exterior contour at points adjacent the outer extremities of said terminals.

3. A condenser stack including adjacent sections, each having opposite groups of metal foil conducting plates interleaved with dielectric sheets, groups of plates of adjacent sections extending beyond corresponding sides of the stack and being gathered together to form connections between adjacent sections, and metallic members associated with said connections and enclosing the same, said metallic members having a smooth rounded exterior contour at points adjacent the outer extremities of said terminals, and being in close metallic contact with the extended portions of said plates across substantially the entire width of the latter.

4. A condenser stack including adjacent sections, each having opposite groups of metal foil conducting plates interleaved with dielectric sheets, groups of plates of adjacent sections extending beyond corresponding sides of the stack, and being gathered together to form connections between adjacent sections, insulating separator plates interposed between adjacent terminal sections and metallic members disposed between said separator plates and enclosing said terminal connections, said metallic members having a smooth rounded exterior contour at points adjacent the outer extremities of said terminals.

5. A condenser stack including adjacent sections each provided with a plurality of conducting plates having terminals extending from the sides of the stack in combination with metallic members enclosing the terminals of both sections, said member comprising sheet metal clips having close metallic contact with the extending portions of the terminals substantially across the entire width of the latter, said clips having a smooth rounded exterior contour at points adjacent the outer extremities of said terminals.

6. A condenser stack including adjacent sections, each having opposite groups of metal foil conducting plates interleaved with dielectric sheets, and a terminal connecting means for adjacent sections comprising portions of groups of plates of adjacent sections extending beyond corresponding sides of the stack and gathered together, the outer member of said terminal connecting means being of smooth rounded exterior contour adjacent the outer extremities of the terminal.

In testimony that I claim the foregoing, I have hereunto set my hand this 20th day of January, 1921.

WILLIAM DUBILIER.